(12) United States Patent
Ciapala et al.

(10) Patent No.: US 7,392,505 B2
(45) Date of Patent: Jun. 24, 2008

(54) TASK TRACING IN A DISTRIBUTED COMPUTING ENVIRONMENT

(75) Inventors: Richard Ciapala, Hoboken, NJ (US);
Nicholas P. Duane, Chatham, NJ (US);
Christopher Warner McCarron, West Hartford, CT (US); Kenneth Nilsen, North Salem, NY (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 10/987,715

(22) Filed: Nov. 12, 2004

(65) Prior Publication Data

US 2005/0091373 A1 Apr. 28, 2005

Related U.S. Application Data

(62) Division of application No. 10/053,376, filed on Nov. 9, 2001, now abandoned.

(51) Int. Cl.
*G06F 9/44* (2006.01)
*G06F 9/45* (2006.01)

(52) U.S. Cl. .................. 717/106; 717/120; 717/168

(58) Field of Classification Search .......... 717/128, 717/168, 120, 106; 702/179; 395/183.21, 395/704; 709/330
See application file for complete search history.

(56) References Cited

U.S. PATENT DOCUMENTS

| 5,621,886 | A | * | 4/1997 | Alpert et al. .................. 714/38 |
| 5,642,478 | A | | 6/1997 | Chen et al. ............. 395/183.21 |
| 5,896,536 | A | | 4/1999 | Lindsey ...................... 395/704 |
| 6,055,492 | A | | 4/2000 | Alexander, III et al. ..... 702/179 |
| 6,087,967 | A | | 7/2000 | Budnik et al. .................. 341/63 |
| 6,446,137 | B1 | | 9/2002 | Vasudevan et al. .......... 709/330 |
| 6,760,903 | B1 | | 7/2004 | Morshed et al. ............. 717/130 |

OTHER PUBLICATIONS

Harden, J. C. et al., "In Search of a Standards-Based Approach to Hybrid Performance Monitoring," *IEEE Parallel & Distributed Technology*, 1995, pp. 61-71.
Wu, C. E. et al., "A Unified Trace Environment for IBM SP systems," *IEEE Parallel & Distributed Technology*, 1996, pp. 89-93.

* cited by examiner

*Primary Examiner*—Mary Steelman
(74) *Attorney, Agent, or Firm*—Woodcock Washburn LLP

(57) ABSTRACT

An architecture that supports the instrumentation of software to generate structured information about its operation. A library of methods and data structure definitions is provided to a developer of a piece of software. The developer includes calls to the methods in order to signal the fact that a given event has occurred. The developer may also cause the program to provide information descriptive of the event by populating data structures defined in the library. The library methods may also contribute to the population of these data structures. In a distributed computing environment in which tasks are performed through a series of calls to remote computers, "per-task" tracing may be performed by sending trace instructions to the remote computers along with the remote calls.

5 Claims, 6 Drawing Sheets

TASK TRACING IN A DISTRIBUTED COMPUTING ENVIRONMENT

CROSS-REFERENCE TO RELATED CASES

This is a divisional of U.S. patent application Ser. No. 10/053,376, entitled "Task Tracing in a Distributed Computing Environment," filed on Nov. 9, 2001 now abandoned.

FIELD OF THE INVENTION

The present invention generally relates to the field of distributed computing. More particularly, the invention relates to an architecture that supports structured generation of event information by a running application, and focused tracing of tasks in a distributed computing environment.

BACKGROUND OF THE INVENTION

No software application—no matter how well designed or implemented—can operate completely maintenance-free. At some point during the operating life of a software application, human support personnel (i.e., an "operator") may need to analyze the software or the hardware environment in which it is running, in order to track down the source of a problem and make appropriate modifications. The software generally facilitates this analysis by emitting "events" as it executes. These events may alert an operator to a potential problem with the software, or may provide a trail that records what the software has been doing during the course of its execution.

While an application's generation of event information can be effective in helping an operator to learn of a problem or track down its source, current systems supporting such event generation have drawbacks. One of these drawbacks is that there is little structure in terms of the types of events that applications generate and the way by which they are generated. Typically, an application developer determines the types of events that an application will emit, and the ways by which those events will be communicated to the operator. Additionally, many applications do not use any structured technique (e.g., a well-defined set of methods) to generate event information, and thus are prone to errors and inconsistencies in the manner in which they generate events. Moreover, there is little uniformity among applications as to the form that the events will take.

Another drawback particularly concerns "trace events"—i.e., fine-grain events that describe key steps in the operation of the program, which are often used by operators to track down the source of a known problem. The generation of trace events by a program is often subject only to coarse, per-process "on/off" controls. This level of control over tracing is generally too coarse for complex applications that are distributed across a large number of processes and machines. For example, an application might process orders for a retail web site. An operator may need to trace a given task, such as the task of receiving an order from a particular customer. This task might be performed by several processes executing on several different machines, where the processes are also performing various operations that are unrelated to the task that the operator is interested in analyzing. However, in order to trace the execution of the customer's order in a conventional system, tracing must be turned on for each of these processes. Such a trace consumes computing resources to generate an enormous amount of event information—much of which is irrelevant to the task that the operator needs to trace. Preferably, the operator should be able to turn on tracing just for one task. Even more preferably, the operator should be able to define what type of trace information (e.g., the value of a particular variable) is relevant, and should be able to receive only the defined type of trace information from the software.

In view of the foregoing, there is a need for a system that overcomes the drawbacks of the prior art.

SUMMARY OF THE INVENTION

The present invention enables software developers to instrument software applications in a manner that supports management of these applications by operators. The invention provides a framework for developers to include event generation support in an application's code such that the software can emit event information in a structured manner. Additionally, the invention provides an architecture for collecting and handling the event information.

One aspect of the invention is the development of software that facilitates the generation of event information by providing a convention for the nature and format of that information. This convention includes the types of events that a program will signal, as well as "properties" for those events. The "properties" are data associated with the event. For example, an "event" might be the opening of a file, and the "properties" of such an event might include the name of the file, the identity of the process that opened the file, the time at which the file is opened, etc. The convention not only includes a definition of the events and properties, but also the format in which they will be communicated. This convention can be defined in the form of a schema.

A convention may come into existence in a number of ways. For example, the developers of the software and the personnel who will operate the software may agree on a convention; a convention may be defined by a generally-accepted standard; the personnel who will maintain the software may create a convention and ask the software developers to code to the convention. The significance of the convention is that it is known to the operator of the software and adhered to by the developer of the software, so that the software can communicate with the operator in a defined manner.

Another aspect of the invention is an architecture in which tracing can take place using the convention. The convention is incorporated into a library, which includes defined methods and data types. The data types represent the "properties" associated with an event. Software generates event information by including calls to the defined methods and populating the data structures that comport with the defined data types. The methods in the library handle the interface between the software and the environment in which it operates. For example, these methods may: produce/not product trace event information depending on whether tracing has been turned on; selectively provide (i.e., "filter") event and/or property information depending on what information the operator wishes to receive; provide the event information to an operator-defined event handler; log the event information in a database; etc. Preferably, the methods can derive certain property information and populate data structures appropriately, thereby reducing the chance for error on the part of the software developer. For example, if the time of an event is to be included in a property, the library method can include this information, thereby reducing the risk that a software developer will omit the necessary instruction.

An additional feature of the invention is the ability to trace on a "per-task" basis in a distributed environment. A system may process a user request by issuing a series of remote calls to various machines or clusters of machines. Trace requests can be attached to these calls, such that a trace request can follow a task along whatever path it takes in a distributed architecture, and the tracing can be turned on narrowly with respect to just those processing elements that participate in the task.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

During the operation of large-scale software, it is often necessary to analyze the operation of the software in order to track down problems or perform other assessments. The best information to perform such an analysis comes from the software itself in the form of events that describe events that occur during the software's operation. The present invention provides an architecture whereby software may be instrumented to provide such event information in a structured way. The architecture of the present invention also facilitates the use of such events to trace a particular task performed in a distributed computing environment.

Exemplary Computing Environment

Figure 1:
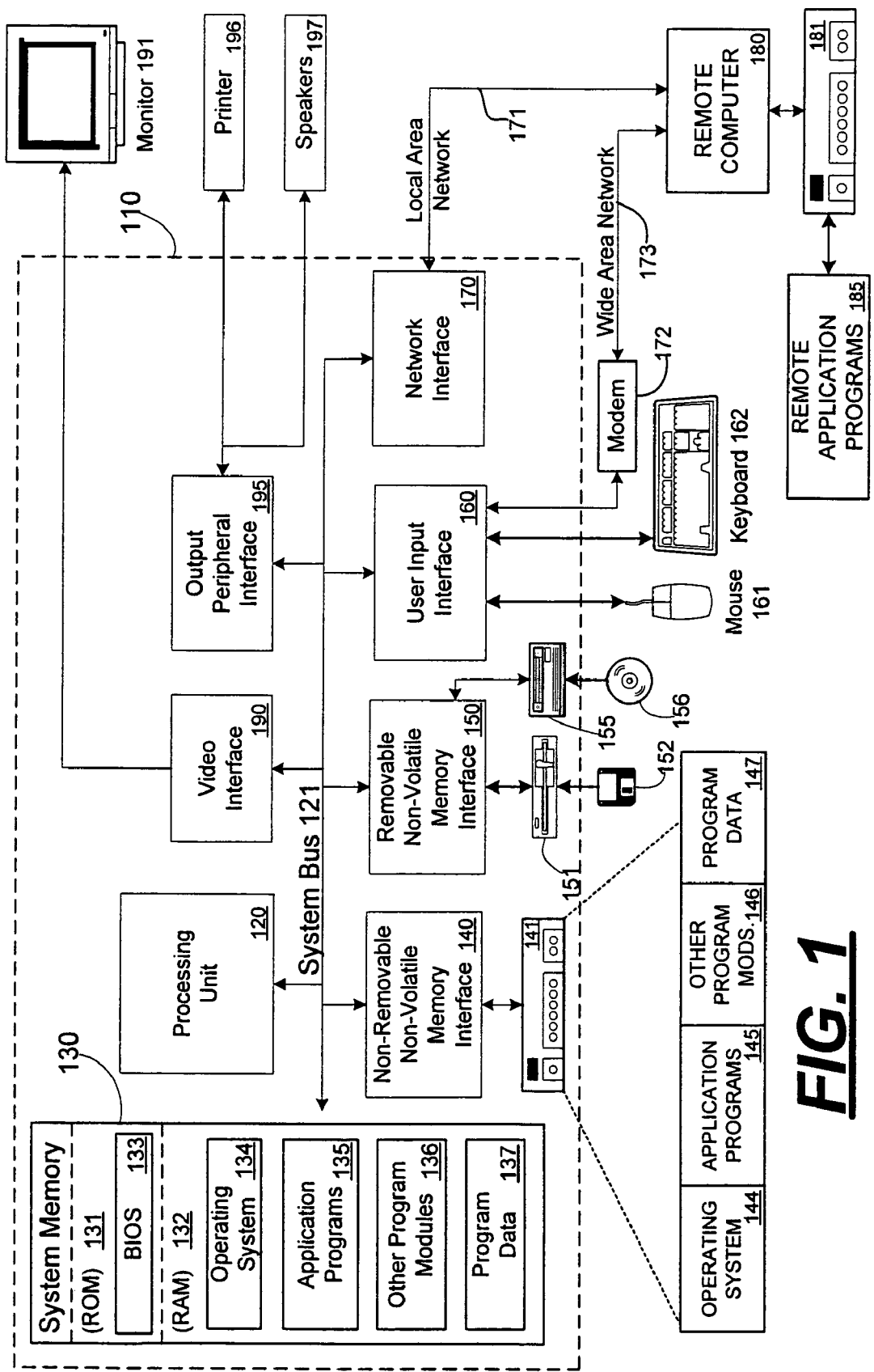
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Events and Properties

One aspect of the present invention provides a structured way for an application program to communicate information about what it is doing to the outside world. (The "outside world," in this context, means systems external to the processes of the application program—e.g., an operator's console, a debugging program, etc.) The "structure" provided by the invention results from a convention describing what events an application program will communicate, and what information will be communicated about those event.

The term "event" refers to some occurrence during the operation of an application that is sufficiently noteworthy that the program may potentially need to inform the outside world that it has occurred. The term "property" refers to descriptive data associated with the event. For example, an "event" might be the opening of a file, and the "properties" associated with this event may be the name of the file, the type of access requested, the time at which the file was opened, etc. Thus, a program may be configured such that every time it opens a file, it calls a method that gathers the appropriate property information, signifies to the outside world the fact that the event has occurred, and provides the gathered property information to the outside world. Some types of events may be generated only if a "trace" mode has been turned on. Typically, a program will emit the most significant events (e.g., detection of down or missing hardware) regardless of whether trace mode is on. However, some types of events are sufficiently mundane (e.g., the opening of a file, the calling of a procedure, etc.) that they are emitted only when trace mode has been turned on. In the case where a method signals such a "trace" event, the method called by the application program may determine whether a "trace" mode has been turned on before it actually performs any of these gathering or signifying functions.

Figure 2:
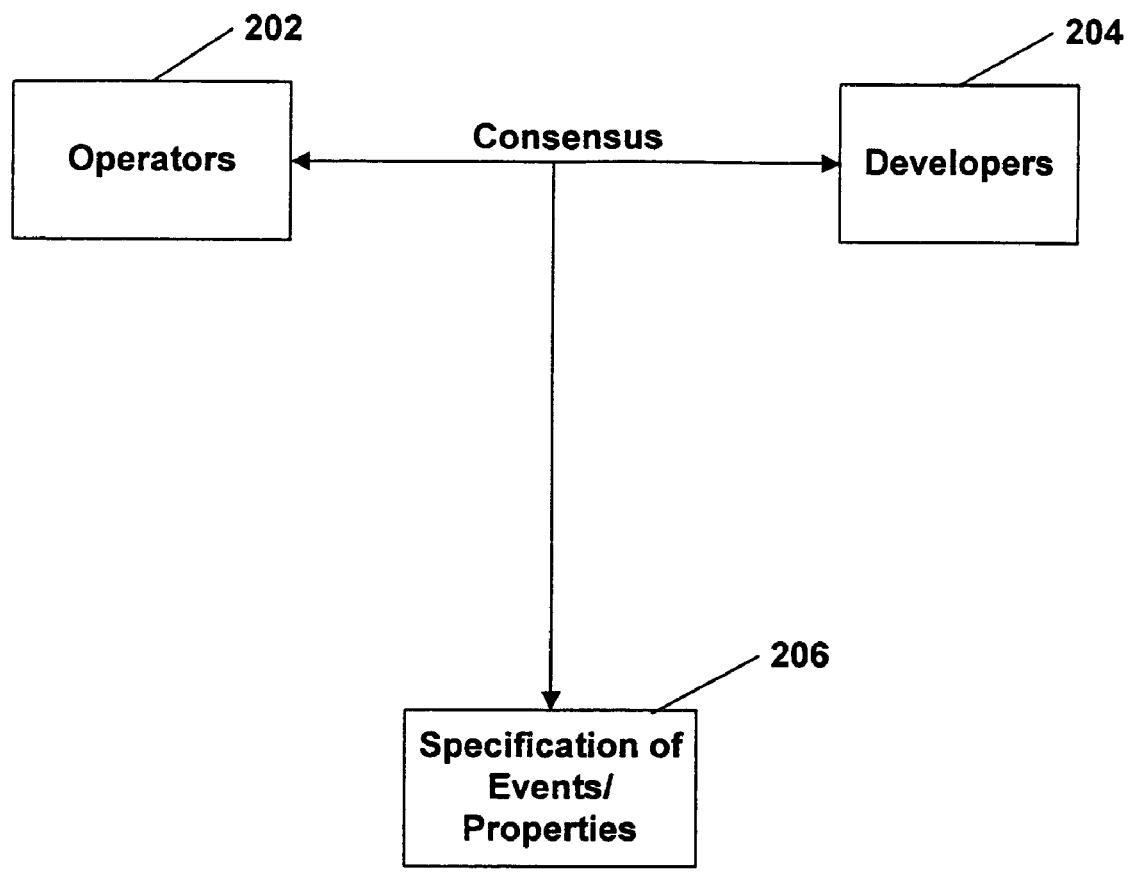
FIG. 2 is a block diagram showing the relationship among a software operator, a software developer, and the events used to communicate to the operator information about the execution of the software.

Referring now to FIG. 2, the convention as to what form events and properties will take is determined by some consensus between operator 202 (i.e., the personnel who will operate and maintain the software by responding to events), and the developers 204 (i.e., the programmers who will write the software). The term "consensus" does not necessarily imply that the substance and form of the events and properties has somehow been negotiated between operators 202 and developers 204; rather, it means merely that operators 202 and developers 204 have a common understanding as to what events mean and in what form they will be communicated. This consensus may come about in various ways. For example, the community of commercial software producers may agree on a standard set of events and properties for software developers to adhere to. As another example, in a large corporation (e.g., a large financial institution) that develops its own special-purpose code, the system operators may specify the type and form of events and properties that they need to keep the company's systems running smoothly, and software developers may be asked to incorporate these requirements into their code.

The consensus as to the substance and form of the events and properties results in a specification 206 of those events and properties. Specification 206 defines: (1) what events will be indicated, (2) what properties will be associated with each event. Specification 206 is essentially an abstraction of the events and properties. As discussed below, specification 206 may be embodied in a library of methods and data structures that can be used by an application to signal the occurrence of events and provide property information.

Figure 3:
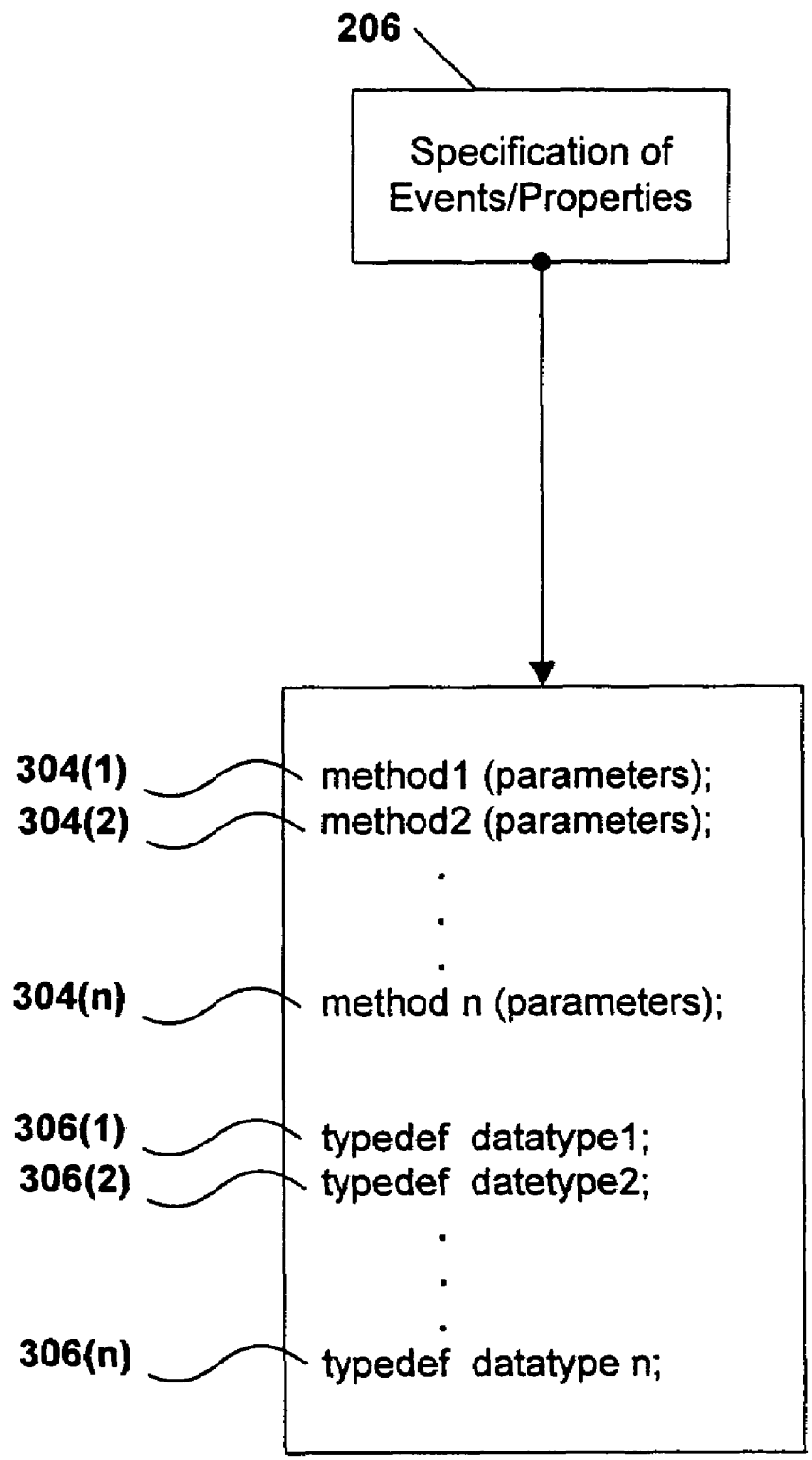
FIG. 3 is a block diagram showing the embodiment of abstract event and property information as a library of methods and data type definitions.

FIG. 3 shows how events and properties may be embodied as a library of methods and data structures. Specification 206 is an abstract description of the types of events that can be signaled by executing software, and the properties associated with those events. Specification 206 may be embodied as a library 302 of methods that can be invoked by executing software, and of data types that can be populated by the software whose events are to be signaled.

Library 302 defines methods 304(1) through 304(n) and data types 306(1) through 306(n). These methods may be invoked by an application program that has been instrumented for tracing in accordance with the invention, and data structures defined in accordance with the library's data types may be populated by such an application program. The actual population of such data structures may be performed by the methods. For example, method 304(1) may populate a data structure defined in accordance with data type 306(1). Alternatively, the application program may manipulate the elements of the data structure directly, although it may be less desirable to create property information in this way because of the risk that the application program will include data and/or format included data in a manner that is inconsistent with the convention that defines the events and properties.

As depicted in FIG. 3, methods may take parameters. The population of a data structure may be based on the parameters passed to method 304(1). For example, suppose than an event is the opening of a file, and that method 304(1) is the method that corresponds to this event. Suppose further that data type 306(1) defines the properties associated with the event of opening a file. Thus, an application program that is instrumented for emitting events invokes method 304(1) every time it opens a file, and passes the name of the opened file to method 304(1) as a parameter. Method 304(1), in turn, may add the name of the file to a data structure having data type 306(1). As further described below, method 304(1) may also add other information to the data structure that can be derived from the environment and that need not be passed as a parameter—e.g., the time at which the file was opened, the physical location of the file, the numerical identifier of the process that opened the file, etc. The application program may include code that populates an appropriate data structure directly, but, as described below, it may be advantageous to have the data inserted into the data structure by a fixed set of methods, since doing so helps to ensure consistency in the format and content of the data.

By providing a library 302 though which an application program may be instrumented to generate events, at least two advantages are achieved. First, the library of defined methods and data structures imposes a structural constraint on the application's developers as to what types of events will be signaled, and how information about those events will be represented. Second, the library frees the application developer of the need to deal with the event processing environment itself, since the methods in the library will perform whatever action is appropriate depending on the circumstances. For example, the library methods may communicate (or not communicate) the happing of a trace event depending on whether tracing has been turned on or off; the methods can communicate with an event handler to invoke operator-defined scripts in response to the happening of events. By providing a library method that the application can invoke at the appropriate point in the program, the details of how a given event is handled remain abstract to the developer, thereby reducing the potential for inconsistency and error in the way an application indicates events.

Figure 4:
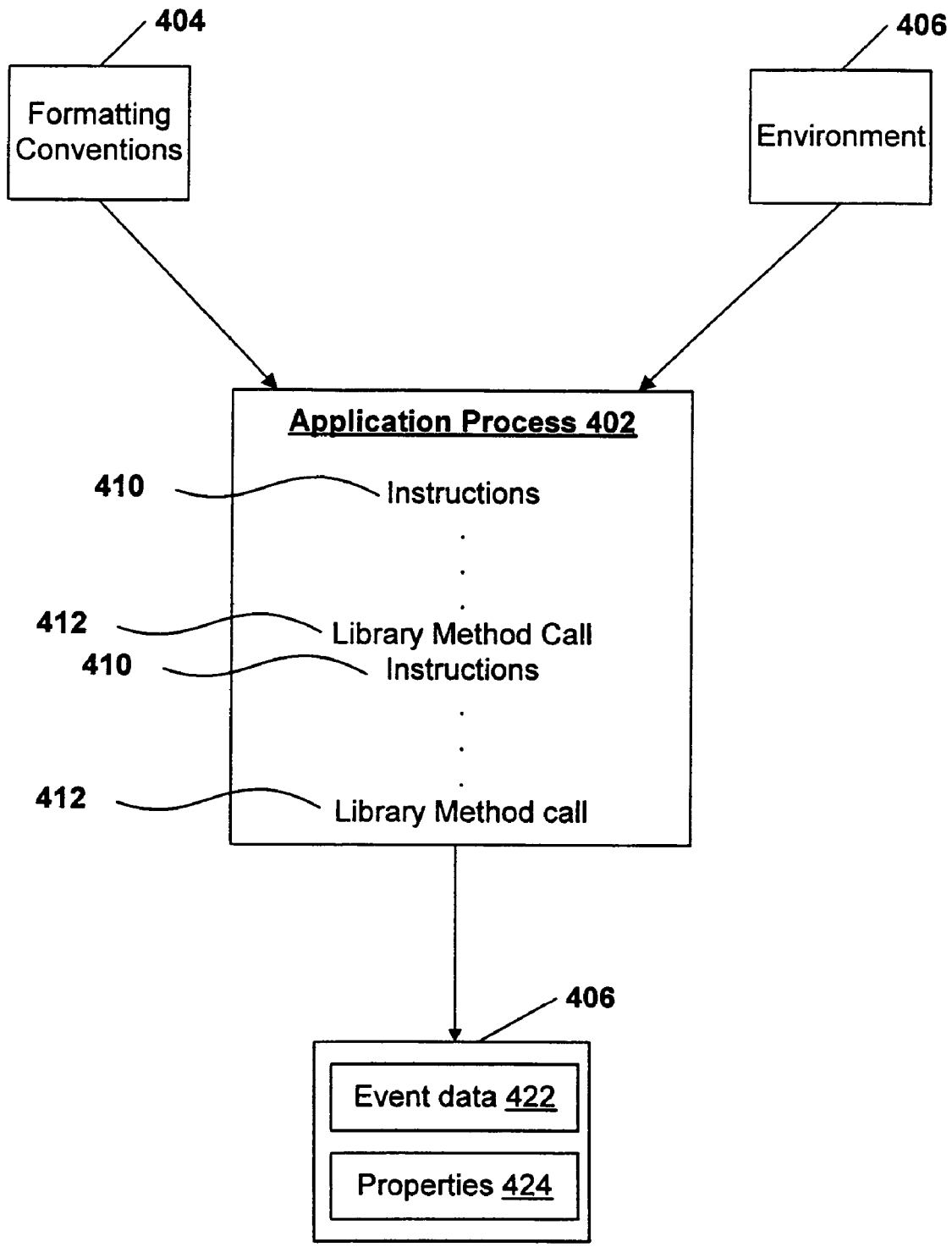
FIG. 4 is a block diagram showing system components that cooperate to produce event and property information.

FIG. 4 shows how an application signals events and generates property information in accordance with the invention. An application executes within process 402. Process 402 is a self-contained execution context, typically provided by an operating system; processes are known in the relevant art and thus are not described at length herein. The instructions 410 of the application execute within process 402 in some sequence. While the sequence of instructions 410 is depicted in FIG. 4 as being serial and terminal, it will be understood by those of skill in the art that instruction sequences may have branches, cycles, etc. Within process 402, instructions 410 of the application execute in some sequence (which may include jumps based on branches and cycles). Some instructions or combinations of instructions may perform an event that is of significance to the event-processing scheme of the present invention. At that point, the application program executes a method 412, thereby indicating that such an event has occurred. Method 412 typically comes from library 312. The method call is, effectively, an instruction (or sequence of instructions) that is inserted in the application program by the developer of the application, in recognition of the fact that a particular sequence of instructions represents the occurrence of an event. For example, if the programmer writes instructions to open a file, the programmer can among those instructions (e.g., at the beginning of the instructions) a method call indicating the event of opening a file.

Method 412 executes in the same process 402 as the relevant application program. Thus, method 412 has access to the same environmental data as does the application program itself. Thus, method 412 can populate a data structure with property information using this environmental information. The population of such a data structure can draw on at least two bodies of information: formatting conventions 404, and environment 406. First, the method can populate the data structure in accordance with formatting conventions 404. Formatting conventions 404 may be represented as a body of data accessible to method 412, but this is not necessarily the case. For example, formatting conventions 404 may be "built-in" to method 412, such that method 412 knows how to format the property information. For example, if a timestamp is to be included in property information, formatting conventions 404 define how the timestamp is to be represented (e.g., the current Greenwich Mean Time, the number of seconds that have elapsed since midnight on Jan. 1, 1900, etc.). These formatting conventions 404 help to avoid the problem of an application's providing event information in inconsistent formats (e.g., different parts of the program providing timestamp information in different formats), which makes it easier for an operator to decipher the relevant property information (or, more importantly, to have the property information deciphered automatically by another program).

Second, the method can populate the data structure in accordance with information derived from environment 406. Such information may include, by way of example, the current time, the process ID of process 402, the current value of process 402's program counter, etc. In other words, while some property information may be passed to method 412 as a parameter (or in some other way) by the application program that executes inside of process 402, other information can be derived automatically by method 412 itself. Method 412's ability to derive certain types of property information (e.g., time, process ID, program counter value, etc.) also contributes to consistency, in that it reduces the likelihood for programmer error that would result if the application developer had to include instructions in the application code to derive the property information and/or insert such information directly into a property data structure. (Even in the case where property information is not derivable from the environment and must be provided by the programmer, consistency in the form of the information can be achieved by the fact that the programmer provides this information by calling method 412, and must provide that information to method 412 in accordance with the structure imposed by the method 412's signature. In a preferred embodiment, the programmer never has to populate the property data structure directly.) It will further be observed that environment 406 includes, at least in part, some information that is accessible only from within process 402 (e.g., the value of process 402's program counter, the value of local variables, etc.), and that access to such environmental information is an advantage of having method 412 (and the library 302 of which it is a part) loaded within process 402.

The call to method 412 generates information 406, which is available outside of process 402, such that events can be perceived (and traced, and reacted to) by processes external to 402. Information 406 can be divided into two types of information: "event data" 422 and properties 424. "Event data" generically refers to information that indicates the bare fact that an event has occurred; properties, as described above, refers to data related to the event which may be descriptive of the circumstances surrounding the event or other environmental factors. An overall system in which such event processing takes place is described below in connection with FIG. 5. However, in its simplest form, "event data" might be made "perceivable" to a process external to process 402 by displaying a message (e.g., "A "file open" event has occurred") on an operator console, together with property information relevant to the console. As discussed below in connection with FIG. 5, more sophisticated forms of event processing are available. For example, event information 422 may be trapped by an event handler, which, in turn, invokes a script that performs some action in response to the event (based, optionally, on information contained in properties 424), calls an operator's wireless pager number, etc. It will be appreciated that event handlers that interface with the system can be provided by third parties, so the operator of the software is not limited by a fixed set of event-handling capabilities. Additionally, certain types of events (e.g., "trace events," as discussed below) may be turned on or off, such that method 412 does not actually generate information 406 in response to being invoked by the relevant application program.

Exemplary Event-Processing Environment

Figure 5:
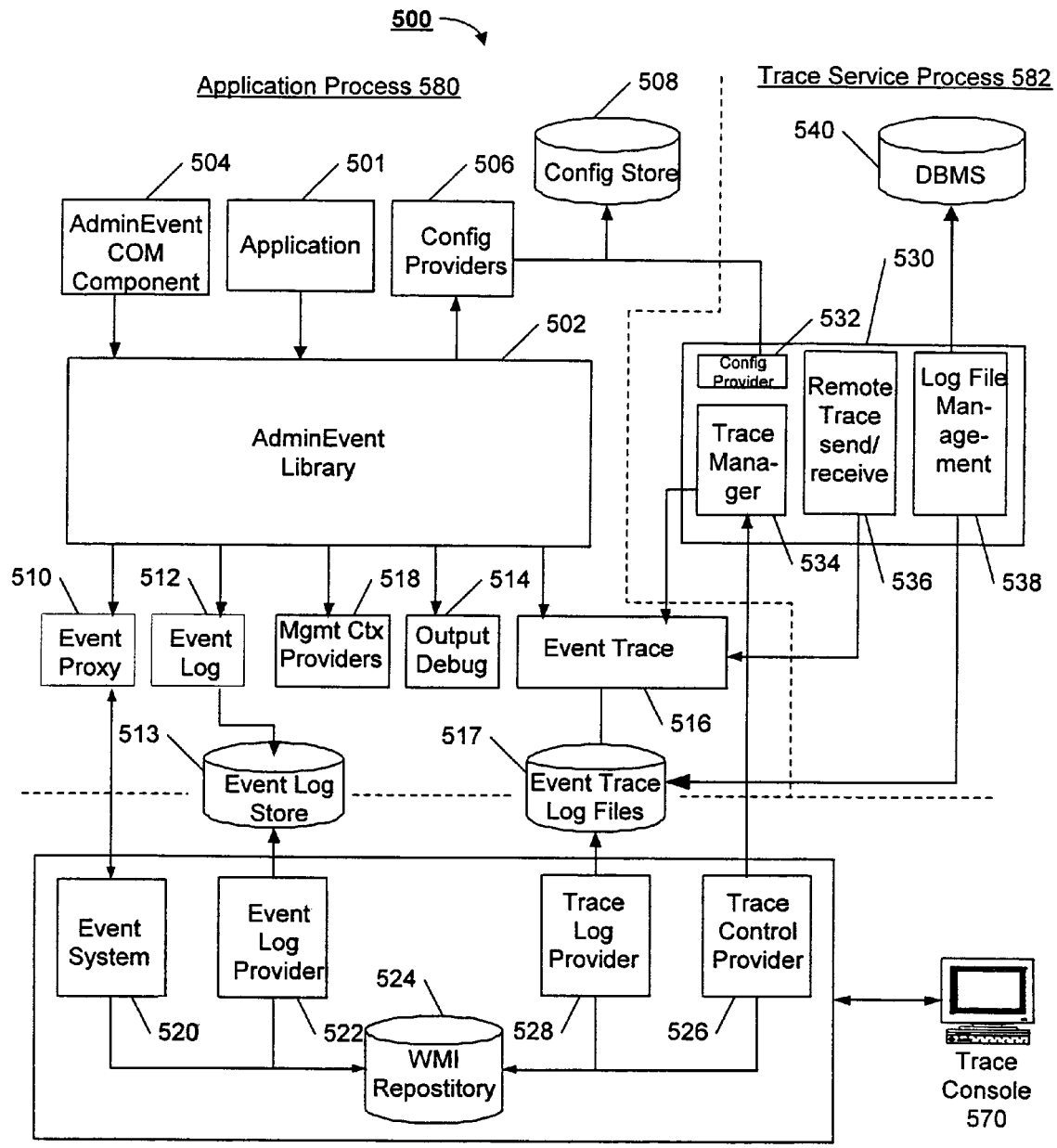
FIG. 5 is a block diagram of an environment in which event processing may take place.

FIG. 5 shows an exemplary framework 500 in which event processing may be performed, and in which an application that has been instrumented to generate events in accordance with the invention may execute. The various components of framework 500 are described below.

Application 501—A software application that has been instrumented to participate in an event-processing system in accordance with the present invention. For example, application 501 may signal the occurrence of events using methods from AdminEvents Library 502 (described below), thereby allowing it to participate in the system.

AdminEvent Library 502—Provides a Microsoft ATL-like ("ActiveX Template Library") programming model that abstracts the emitting of events from software, as described more particularly above in connection with FIGS. 3 and 4. AdminEvents Library 502 generally corresponds to library 302 shown in FIG. 3.

AdminEvent Wrapper 504—An object that provides a wrapper around most of the AdminEvent framework functionality for use by scripts, Visual Basic and Java. AdminEvent Wrapper 504 may be implemented as a Component Object Model (COM) object in a MICROSOFT WINDOWS operating system-based environment.

Configuration Providers 506—An object that abstracts where the AdminEvent framework gets its configuration.

Configuration Store 508—A data store in which AdminEvent framework 500 stores its configuration. In a MICROSOT WINDOWS operating-system based environment, this data store may be implemented as part of a machine's local WINDOWS registration database.

WMI Event Proxy 510—In an exemplary environment in which Microsoft's Windows Management Instrumentation (WMI) technology is used, WMI event proxy 510 allows processes other than WinMgmt.exe to fire WMI events.

Event Log 512—An event log present on the local computer system. Event log 512 is accompanied by an API through which an application program accesses event log 512. An exemplary event log 512 is the event log present on all systems running the MICROSOFT WINDOWS 2000 operating system, which is known in the art and described in http://msdn.microsoft.com/library/psdk/winbase/eventlog_2tbb.htm. The actual logged events are stored in event log store 513.

Output Debug 514—A legacy tracing mechanism available in the MICROSOFT WINDOWS operating system, which is commonly used by developers for design time tracing. Framework 500 preferably includes support for output debug 514 so that developers can easily see the events emitted from their software without having to install or run an administration tool. However, output debug 514 is preferably not enabled in final (or released) versions of code. Output debug 514 is known in the art and is described in http://msdn.microsoft.com/library/psdk/winbase/debug_3pt3.htm.

Event Trace Facility 516—A component that handles traces as well as in process filtering. An exemplary embodiment of event trace facility 516 is the event trace system component of the MICROSOFT WINDOWS 2000 operating system, which is known in the art and described in http://msdn.microsoft.com/library/psdk/evtrace/evt_portal_0c2t.htm. Event trace system 516 records a log of events in event trace log files 517.

Management Context Providers 518—Components that implement an explicit set of interfaces so that the Admin- Event framework can access and set the management context. Management context providers 518 are preferably implemented as COM objects. Management context providers 518 are created specifically for various different types of "middleware" (e.g., COM+, SOAP, BizTalk, etc.).

Event System 520—A publish and subscribe event system for management events. Allows AdminEvents to be routed to any number of destinations including central repositories, scripts, management agents, management consoles (e.g., trace console 570), email addresses, pager numbers, etc. Event system 520 is used to implement the feature of the invention that allows the software operator to determine what will happen in response to the occurrence of an event. Preferably, event system 520 is uses WMI technology, which is known in the art and described in http://msdn.microsoft.com/library/psdk/wmisdk/event_4z1a.htm.

Event Log Provider 522—Provides an interface to read the event log 512. Preferably, event log provider 522 is uses WMI technology to provide a WMI interface to a WINDOWS event log.

WMI Repository 524—A machine specific store that stores schema and static objects. This is where event class definitions are stored.

Trace Control Provider 526—A component that provides the functionality of allowing trace loggers to be enumerated, created, deleted, updated, started and stopped; allowing trace sources to be enumerated and updated; allowing trace service settings to be read and updated; allowing log file flushes to be scheduled, updated and deleted; and allowing event processes to be registered, updated and unregistered. Trace control provider 526 is preferably embodied as a WMI provider.

Trace Log Provider 528—A component that provides the functionality of allowing registered trace logs to be enumerated, deleted and copied; allowing any trace log to be registered with the provider; and allowing the events with the trace log to be enumerated using those events' schema. Trace log provider 528 has access to trace log files 517, and receives the trace logs from those files.

Trace Service 530—A service which extends the inherent capabilities of existing event trace facility 516. Trace service 530 preferably comprises a configuration provider 532 (see description above of configuration providers 506), a trace manager, a remote trace send/receive facility 536, and a log file management facility 538. These constituent components of trace service 530 are described below.

Trace Manager 534—Creates, deletes and updates trace loggers. A "logger" refers to a trace session; an exemplary "logger" is defined by the MICROSOFT WINDOWS 2000 trace system. Trace manager 534 makes loggers persistent. This allows a script or support person to create a logger and assign multiple trace sources, a log file, and logger settings. Later the logger can be started and stopped. The definition and state of the logger survives machine reboots. Trace manager 534 interacts with event trace facility 516 in order to create, delete, and update trace loggers maintained by event trace facility 516.

Remote Trace Send\Receive Facility 536—Routes trace events to other machines. Remote tracing facilitates "per-task" tracing, which is described below in connection with FIG. 6.

Log File Management Facility 538—Provides services to schedule the flushing of log files from a web or application server to a central trace server. A flush can be scheduled to run after a particular amount of data is logged, after a specified time interval or whichever comes first. A flush can also be manually invoked through a script described later or any other WMI client.

Trace service 530 may also host event processor components. Event processor components are preferably COM components that implement a set of standard interfaces. The trace service monitors a specified directory on behalf of the processor. If a new log file is copied to the directory, the events in the log file are extracted from the log file and sent to the event processor for processing. When the event processor is finished with the events in that log file, the trace service is notified and the log file is deleted. This ability to host event processor components supports the extensibility of the system's functionality; by writing an appropriate COM component, the system can be configured to respond to events in any manner needed.

One event processor that may be provided is a database event processor, which processes events and stores them in a commercial database system 540. Events can then be maintained for long periods of time as well as have complex queries performed against them.

In the exemplary framework 500 shown in FIG. 5, the different components operate in different processes—an application process 580, a trace service process 582, and a management instrumentation process 584. The process boundaries are shown by dashed lines. As discussed above, a process is a self-contained execution context that is known in the art. Event log store 513 and event log trace files 517 are shown as crossing a process boundary, since these are files (i.e., data residing on a disk), which are accessible to all processes (and, in the case shown, are used by both application process 580 and management instrumentation process 584.

Tracing on a Per-Task Basis

One feature of the present invention is the ability to turn tracing on for a defined task. Conventionally, tracing can be turned on or off for a given process. This level of control, however, may be too coarse for many distributed applications. First, such per-process tracing may be overinclusive in the sense that a given process may be performing many actions that are of no relevance to the problem that tracing has been invoked to locate. Second, turning on tracing for a single process may be underinclusive, because in many distributed applications a task is performed by various processes executing, perhaps, on different machines. Turning on tracing for every process on every machine is often an unacceptable solution, since it generates much extraneous trace information for the software operator to sift through, and also slows down performance of the entire system. Additionally, since it may be desirable to trace activity relating to a particular user, and since a process may be performing functions that relate to several users, turning on tracing for a given process may generate trace information about users who are of no interest to the operator. Often, the software operator can identify a defined task as the "trouble" that needs to be traced, and it would be advantageous if the operator could turn on tracing with respect to just that task. The present invention provides a mechanism for such per-task tracing.

Figure 6:
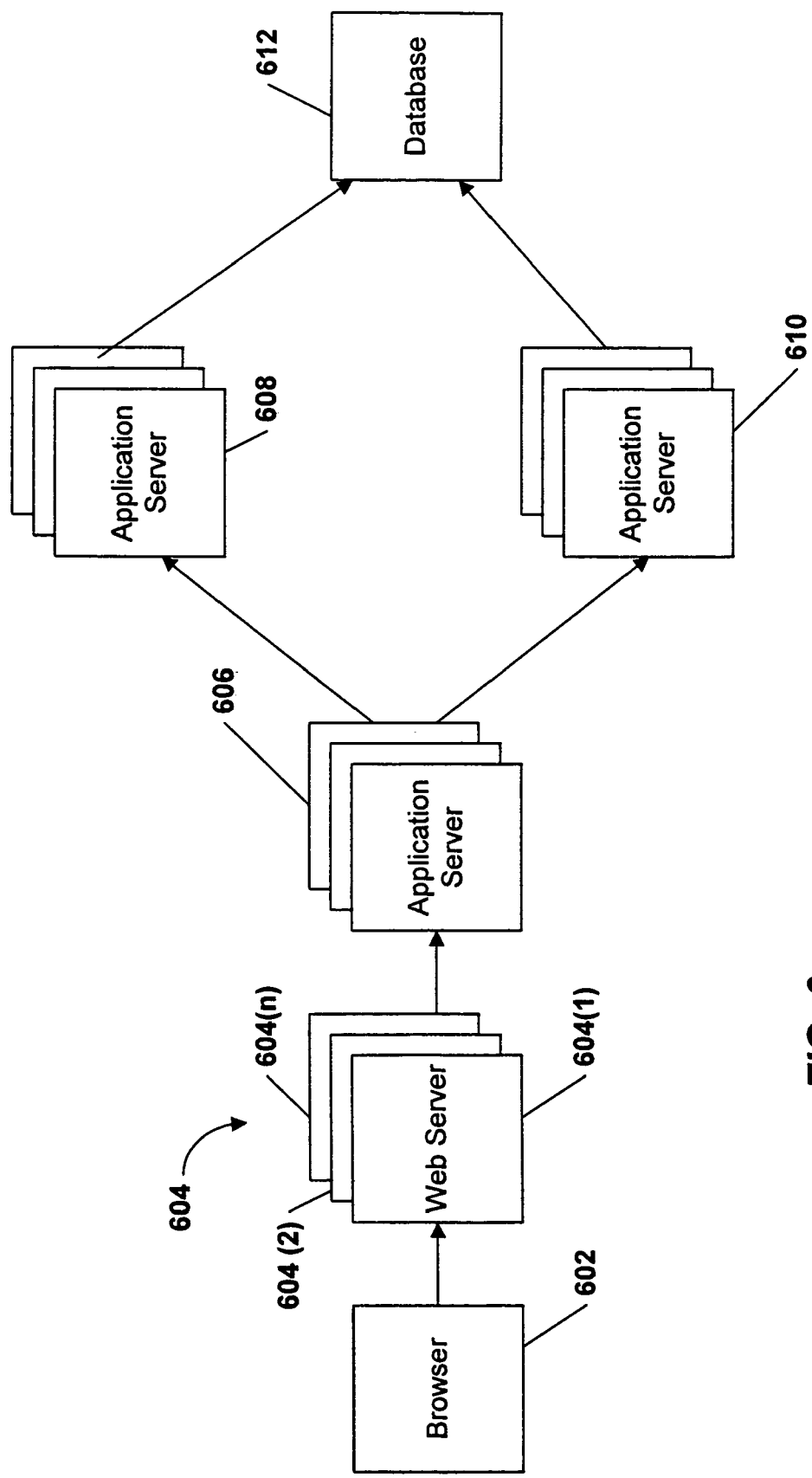
FIG. 6 is a block diagram showing the flow of a task and an accompanying trace request through a distributed processing environment.

FIG. 6 shows the processing of a typical distributed task. In the example of FIG. 6, the relevant task is an Internet-based transaction performed through a web browser, although it will be appreciated by those of skill in the art that an Internet-based transaction is merely one example of a task that can be performed in a distributed environment. FIG. 6 is equally representative of other types of distributed tasks.

In FIG. 6, a user operates browser 602 to engage in a transaction with web server 604. Typically, a user engages in such a transaction by issuing Hypertext Transport Protocol (HTTP) requests to web server 604, in response to which web server 604 downloads Hypertext Markup Language (HTML) web pages to browser 602. In most web sites that perform commercial functions, the page that web server 604 downloads to browser 602 is not a fixed page, but rather a page that has been dynamically created by one or more applications that service a web site hosted by web server 604. Thus, when web server 604 receives a request from browser 602, web server 604 may forward the request (or information based on the request) to application server 606. Application server 606 may execute an application program that generates the actual content to be downloaded to browser 602. Moreover, application server 606 does not necessarily generate that content directly, but may contact application servers 608 and 610 to create pieces of the content. Application server 608 and 610 may each execute their own applications. Additionally, application servers 608 and 610 may retrieve content from a database 612 as part of the process of creating content.

Moreover, web server 604, and application servers 606, 608, and 610 may each be a cluster of servers having duplicative functions, since such a cluster has a greater throughput than a single server. Thus, for example, web server 604 may actual comprise servers 604(1), 604(2), . . . 604(n), each of which performs the same function, such that when a request comes in from browser 602, the request can be routed to whichever of servers 604(1) through 604(n) has the capacity to handle the request. Application servers 606, 608, and 610 may, likewise, be clusters of servers having duplicative functions. The exact configuration shown in FIG. 6—that is, one web server 604, three application servers 606, 608, and 610, and one database 612—is merely exemplary. It will be understood by those of skill in the art that the overriding import of FIG. 6 is that, in a distributed environment, a single request may be serviced by several machines performing various different functions. Moreover, in many cases (e.g., where a request can be routed to any one of a number of cluster machines depending upon availability), the actual path that the request will follow is indeterminate at the time of the request.

The present invention allows tracing to be turned on with respect to a given task. For example, suppose that web server 604 operates a retail web site. A task involving such a web site might be taking a sales order from a given customer. In order to take such an order, the customer uses browser 602 to provide information to web server 604. Web server 604, in turn, issues a remote procedure call to an application running at application server 606. Application server 606, in turn, issues remote procedure calls to applications running at application servers 608 and 610. Those applications, in turn, may issue queries to database 612. Each of these calls or queries made from one component to the next involves transmitting data from one machine (i.e., the machine issuing the call) to another machine (i.e., the machine that will process the call). In accordance with the invention, trace instructions can be "piggybacked" on top of the data. Thus, the trace requests (and any parameters that affect the request) follow the procedures to be traced. An advantage of this method is that, at the time that a task is started, tracing can be performed for the entire task without knowing where the path of processing the task is going to lead. That is, it need not be known at the time a task is started which servers (or server clusters) will be involved in processing the task, or which machine in a given server cluster will be involved in processing the task, since the same mechanism used to route the processing request to a given machine is also used to route the trace request to that machine. When the various application programs that are used to process the task signal the happening of events using a defined set of methods as discussed above in connection with FIGS. 2-4, these methods can use the "piggybacked" information to determine whether tracing is on or off—and emit event/property information accordingly.

Thus, by "piggybacking" the trace requests onto the procedure calls, a trace request can follow a specific task through the various components of a distributed application, and can be used to provide "per-task" tracing.

The "piggybacking" is performed by a "management context provider" that is adapted for the particular "middleware" (e.g., HTTP, etc.) that is used to transport the information from one machine to another. When the middleware receives data (e.g., a remote call) to be transported from one machine to another, the middleware's management context provider at the sending machine adds the piggybacked trace request to that data. Once the data arrives at its destination machine and is received by the corresponding middleware at that machine, the management context provider intercepts the piggybacked data.

A refinement to this focused "per-task" tracing scheme is that the "piggybacked" information that specifies that tracing should occur can also be used to narrow the type of trace information that will be generated. For example, it can be specified that only a particular event or type of event should be emitted, or that only certain property information (as opposed to all potentially available property information) should be emitted. This, in effect, creates not only a focused trace, but also a filtered one.

In a preferred embodiment, there are four exemplary types of filtering:

Source level filtering, in which events are filtered based on the source they come from. The "source" can be defined at whatever level of granularity is appropriate for the application. For example, a source may be a process, something within a process (e.g., a COM component or C++ class), or a group of multiple processes.

Event-type filtering, where events are filtered based on their type (e.g., a filter that provides file-open events, but not function-call events).

Property-level filtering, in which certain properties associated with an event are provided, but others are not.

Task-level filtering, in which events are filtered based on the task to which they relate. This is the per-task tracing described above.

Exemplary Schema for Properties

As discussed above, one feature of the present invention is the creation of a convention for communicating events and information about events; the information about an event has been referred to as a "property." Above, the concept of a fixed representation for property information has been described as a user-defined type (e.g., a "typedef" in the C programming language). However, a richer representation of properties is a schema. The following examples are schema definitions (.MOF files, in the MICROSOFT WINDOWS environment) for certain types of properties. The examples are definitions for "administrative events" and "trace events." An "administrative event" is a general label applied to an event that a program communicates about its execution, whereas a "trace event" is a specific type of administrative event that is emitted when tracing is turned on. Thus, as shown below, trace event properties are defined as special types of administrative event properties.

An exemplary schema for administrative event properties is as follows:

```
[
    description("Used to group events"),
    uuid("{5F8C52B0-D0FA-42fe-917B-D9BF48EC4B55}") : ToInstance
]
class MSTrace_EventGroup
{
    [key]
    string Name;
    string Description;
    string CPPHeader;
    string MOFFile;
    string EventStrMC;
    string ErrorStrMC;
    string COMWrapper;
    boolean GenErrorStrDLL=True;
    boolean GenEventStrDLL=True;
    boolean GenEventManDLL=True;
    uint32 EventIDGen;   // 0 - Manual, 1 - group unique, 2 -
                         // namespace unique,
                         // 3 - Same event id
    sint32 ErrorCodeGen;// 0 - Manual, 1 - group unique, 2 -
                         namespace unique,
                    //           3 - Use eventid
    string ProjectDir;
    uint32 SameEventID  =0x1000;
    uint32 LastGroupEventID=0x1000;
```

```
        uint32 LastGroupErrorCode=0x1000;
        boolean SystemGroup = False;
        string GroupUUID;
        string GroupIID;
        string GroupTLBID;
};

instance of MSTrace_EventGroup
{
        Name="Standard AdminEvents";
        Description="Events defined by the AdminEvent framework";
        CPPHeader="";
        MOFFile="";
        EventStrMC="";
        ErrorStrMC="";
        COMWrapper="";
        GenErrorStrDLL=False;
        GenEventStrDLL=False;
        GenEventManDLL=False;
        LastGroupEventID=0x1000;
        LastGroupErrorCode=0x1000;
        SystemGroup=True;
        GroupUUID="{B58CFF2C-C5D5-4aae-9921-3961A5ABF94B}";
        GroupTLBID="{F950F322-BFFF-4091-A718-B3A294DCFF09}";
        GroupIID="{F10A729A-0A9B-4f39-B4EF-321C04F66982}";
};
```

```
//
//      Register registry provider for this namespace
//
instance of __Win32Provider as $PropProv
{
   Name = "RegPropProv";
   Clsid = "{72967901-68EC-11d0-B729-00AA0062CBB7}";
};

instance of __PropertyProviderRegistration
{
   Provider = $PropProv;
   SupportsPut = TRUE;
   SupportsGet = TRUE;
};

[
      Abstract,
      Locale(1033) : ToInstance,
      UUID("{8502C572-5FBB-11D2-AAC1-006008C78BC7}") :
ToInstance
]
class CIM_Setting
{
  [read : ToSubclass,MaxLen(256) : ToSubclass]
  string SettingID;
  [read : ToSubclass,MaxLen(64) : ToSubclass]
```

```
    string Caption;
    [read : ToSubclass]
    string Description;
};

[
        description("Settings for critical event delivery."),
        uuid("{1EA4F01E-B2D9-4faa-AC36-72B5CBE50EBD}") :
ToInstance,
        dynprops
]
class CriticalEventSetting : CIM_Setting
{
        [
                key
        ]
        string SettingID;

[
                valuemap{0x1, 0x2, 0x4},
                values{"NTEventLog","NoWMIEvent","OutputDebug"}
        ]
        uint32 DebugWriteOptions;

[
                valuemap{0x1, 0x2, 0x4},
                values{"NTEventLog","NoWMIEvent","OutputDebug"}
        ]
```

```
        uint32 DefaultWriteOptions;
};

[
        dynprops
]
instance of CriticalEventSetting
{
        SettingID = 1;
        Caption = "CriticalEventSetting";
        Description = "Settings for critical event delivery.";

[
        PropertyContext("local|HKEY_LOCAL_MACHINE\\SOFTWARE\\Microsoft\\BlueStar\\CriticalEvents|DebugWriteOptions"),
                Dynamic,
                Provider("RegPropProv")
        ]
        DebugWriteOptions;

[
        PropertyContext("local|HKEY_LOCAL_MACHINE\\SOFTWARE\\Microsoft\\BlueStar\\CriticalEvents|DefaultWriteOptions"),
                Dynamic,
                Provider("RegPropProv")
        ]
```

DefaultWriteOptions;
};

[
    ProgramInterface(FALSE), description("Required base class for any AdminEvent."), uuid("{48147F4D-50E2-481a-AFDD-D2EAF5904492}") :
ToInstance, EventGroup("Standard AdminEvents") : ToInstance, ParamStringGeneration("Event") : ToSubclass ToInstance, EventStringTemplate("The following event was written:\r\n%1")
: ToSubclass ToInstance
]
class AdminEvent : AdminEventBase
{
};

[
    description("Event used to write an unstructured event message"),

EventGroup("Standard AdminEvents") : ToInstance, uuid("{C2C6FE0F-B79F-46b7-A6B7-6F47EB957655}") :
ToInstance
]
class AdminEventMessage : AdminEvent
{
    [id(0) : ToSubclass, PopulateMode("Manual") : ToSubclass, ParamIndex(0)]
        string Message;

string SourceDisplayName;

[id(4) : ToSubclass, PopulateMode("Automatic") : ToSubclass, PropertyFilter(0x80) : ToSubclass]

uint16 SourceMajorVersion;

[id(5) : ToSubclass, PopulateMode("Automatic") : ToSubclass, PropertyFilter(0x80) : ToSubclass]

uint16 SourceMinorVersion;

[id(6) : ToSubclass, PopulateMode("Automatic") : ToSubclass]

datetime DateTime;

[id(7) : ToSubclass, PopulateMode("Automatic") : ToSubclass]

real64 MachineTickCount;

[id(8) : ToSubclass, PopulateMode("Manual") : ToSubclass]

uint32 Category;

[id(9) : ToSubclass, PopulateMode("Manual") : ToSubclass]

uint32 EventID;

[id(10) : ToSubclass, PopulateMode("Automatic") : ToSubclass, PropertyFilter(0x100) : ToSubclass, MaxLen(64) : ToSubclass]

string EventGUID;

};

[

ProgramInterface(FALSE), description("Base class for AdminEvent events with BizTask specific properties."), uuid("{E4D9E38C-214E-4168-ACFA-E280C8900C1B}") : ToInstance, EventGroup("Standard AdminEvents") : ToInstance, ParamStringGeneration("Event") : ToSubclass ToInstance,

```
        EventStringTemplate("The following event was written:\r\n%1")
: ToSubclass ToInstance
]
class AdminEventBizTask : AdminEventCommon
{
        [id(0) : ToSubclass, MaxLen(256) : ToSubclass,
PopulateMode("Either") : ToSubclass, PropertyFilter(0x10) :
ToSubclass]
        string BizTask;
        [id(1) : ToSubclass, MaxLen(64) : ToSubclass,
PopulateMode("Either") : ToSubclass, PropertyFilter(0x10) :
ToSubclass]
        string BizTaskID;
        [id(2) : ToSubclass, MaxLen(64) : ToSubclass,
PopulateMode("Either") : ToSubclass, PropertyFilter(0x10) :
ToSubclass]
        string BizTaskInstanceID;
        [id(3) : ToSubclass, PopulateMode("Either") : ToSubclass,
PropertyFilter(0x10) : ToSubclass]
        sint32 BizTaskHopID;
};

[
        ProgramInterface(FALSE),
        description("Base class for AdminEvent events with debug
specific properties."),
        uuid("{0302FA62-D98B-4814-ACFC-01546AB63F79}") :
ToInstance,
```

EventGroup("Standard AdminEvents") : ToInstance,

ParamStringGeneration("Event") : ToSubclass ToInstance,

EventStringTemplate("The following event was written:\r\n%1") : ToSubclass ToInstance

]

class AdminEventDebug : AdminEventBizTask

{

[id(0) : ToSubclass, MaxLen(32) : ToSubclass, PopulateMode("Automatic") : ToSubclass, PropertyFilter(0x40) : ToSubclass]

string SourceCluster;

[id(1) : ToSubclass, PopulateMode("Manual") : ToSubclass, PropertyFilter(0x80) : ToSubclass]

sint32 SourceInstanceID;

[id(2) : ToSubclass, PopulateMode("Automatic") : ToSubclass, PropertyFilter(0x4) : ToSubclass]

uint32 ProcessID;

[id(3) : ToSubclass, PopulateMode("Automatic") : ToSubclass, PropertyFilter(0x4) : ToSubclass]

uint32 ThreadID;

[id(4) : ToSubclass, MaxLen(64) : ToSubclass, PopulateMode("Either") : ToSubclass, PropertyFilter(0x8) : ToSubclass]

string TransactionID;

[id(5) : ToSubclass, MaxLen(64) : ToSubclass, PopulateMode("Automatic") : ToSubclass, PropertyFilter(0x8) : ToSubclass]

string ActivityID;

[id(6) : ToSubclass, MaxLen(256) : ToSubclass, PopulateMode("Either") : ToSubclass, PropertyFilter(0x20) : ToSubclass]

string CurrentUser;

[id(7) : ToSubclass, MaxLen(256) : ToSubclass, PopulateMode("Automatic") : ToSubclass, PropertyFilter(0x20) : ToSubclass]

string CallingUser;

[id(8) : ToSubclass, MaxLen(256) : ToSubclass, PopulateMode("Automatic") : ToSubclass, PropertyFilter(0x20) : ToSubclass]

string OriginalUser;

[id(9) : ToSubclass, PopulateMode("Manual") : ToSubclass, PropertyFilter(0x1) : ToSubclass]

string Input;

[id(10) : ToSubclass, MaxLen(512) : ToSubclass, PopulateMode("Manual") : ToSubclass, PropertyFilter(0x80) : ToSubclass]

string SourceCodeFile;

[id(11) : ToSubclass, PopulateMode("Manual") : ToSubclass, PropertyFilter(0x80) : ToSubclass]

sint32 SourceCodeLineNumber;

[id(12) : ToSubclass, MaxLen(256) : ToSubclass, PopulateMode("Either") : ToSubclass, PropertyFilter(0x80) : ToSubclass]

string SourceImplementedBy;

[id(13) : ToSubclass, MaxLen(64) : ToSubclass, PopulateMode("Either") : ToSubclass, PropertyFilter(0x80) : ToSubclass]

string SourceFunctionName;

[id(14) : ToSubclass, MaxLen(32) : ToSubclass, PopulateMode("Automatic") : ToSubclass, PropertyFilter(0x40) : ToSubclass]

string CallingMachine;

[id(15) : ToSubclass, MaxLen(32) : ToSubclass, PopulateMode("Automatic") : ToSubclass, PropertyFilter(0x40) : ToSubclass]

string OriginalMachine;

};

[
    description("Test AdminEvent. For AdminEvnet diagnostic usage."), uuid("{8A4635C5-0D73-44e2-A6CD-591E881953A8}") : ToInstance, hidden
]
class AdminEventTest : AdminEventCommon
{

[id(0) : ToSubclass, PopulateMode("Manual") : ToSubclass]
    sint8 Char;

[id(1) : ToSubclass, PopulateMode("Manual") : ToSubclass]
    uint8 Byte;

[id(2) : ToSubclass, PopulateMode("Manual") : ToSubclass]

sint16 Short;

[id(3) : ToSubclass, PopulateMode("Manual") : ToSubclass]
uint16 Word;

[id(4) : ToSubclass, PopulateMode("Manual") : ToSubclass]
char16 Wchar;

[id(5) : ToSubclass, PopulateMode("Manual") : ToSubclass]
sint32 Long;

[id(6) : ToSubclass, PopulateMode("Manual") : ToSubclass]
uint32 Dword;

[id(7) : ToSubclass, PopulateMode("Manual") : ToSubclass]
sint64 LongLong;

[id(8) : ToSubclass, PopulateMode("Manual") : ToSubclass]
uint64 DwordDword;

[id(9) : ToSubclass, PopulateMode("Manual") : ToSubclass]
real32 Float;

[id(10) : ToSubclass, PopulateMode("Manual") : ToSubclass]
real64 Double;

[id(11) : ToSubclass, PopulateMode("Manual") : ToSubclass]
string String;

};

An exemplary schema for trace event properties, based on the administrative event property schema shown above, is as follows:

include ("adminevent.mof"); // include administrative event property
// schema describe above

[

```
        ProgramInterface(FALSE),
        description("Base class for all trace events. Trace events are "
                    "performant events and can be emitted at any point "
                    "in an event source's execution. By default, trace events "
                    "are emitted to Windows Event Trace system and, in DEBUG builds, "
                    "OutputDebugString."),
        EventGroup("Standard AdminEvents") : ToInstance,
        uuid("{1FA916C2-EF5A-4a28-B6E8-4196CD587B4C}") : ToInstance
]
class TraceEvent : AdminEventDebug
{
        uint32 EventID = 0x0014;
        uint32 Category = 0x00000001;

[id(0) : ToSubclass, PopulateMode("Automatic") : ToSubclass]
        uint32 CategoryFilter;
        [id(1) : ToSubclass, PopulateMode("Automatic") : ToSubclass]
        uint32 OptionsFilter;
        [id(2) : ToSubclass, PopulateMode("Automatic") : ToSubclass]
        uint32 SourceCategoryFilter;
        [id(3) : ToSubclass, PopulateMode("Automatic") : ToSubclass]
        uint32 SourceOptionsFilter;
        [id(4) : ToSubclass, MaxLen(256) : ToSubclass,
PopulateMode("Either") : ToSubclass]
```

```
        string BizTaskUserSession;
};

[
    description("Event used to write an unstructured critical event message."),
    EventGroup("Standard AdminEvents") : ToInstance,
    uuid("{A7C46469-1B39-4915-A3B8-CB5A9A0DB387}") : ToInstance
]
class TraceEventMessage : TraceEvent
{
    [ParamIndex(1), ParamDefault(0x00000001), PopulateMode("Manual")]
    uint32 Category = 0x00000001;
    [ParamIndex(2), ParamDefault(0x0014), PopulateMode("Manual")]
    uint32 EventID = 0x0014;

[id(0) : ToSubclass, PopulateMode("Manual") : ToSubclass, ParamIndex(0) : ToSubclass]
    string Message;
};

[
    description("Event used to write an internal, unstructured critical event message."),
    EventGroup("Standard AdminEvents") : ToInstance,
``` uuid("{A24D5D50-A216-48c4-A125-F315C8091FCA}") :
ToInstance

]

class TraceEventInternalMessage : TraceEventMessage

{

[ParamIndex(0)]

string Message;

[ParamIndex(1), ParamDefault(0x40000000)]

uint32 Category = 0x40000000;

[ParamIndex(2), ParamDefault(0x0014)]

uint32 EventID = 0x0014;

};

[ description("An event emitted when an execution element is being invoked."),

EventGroup("Standard AdminEvents") : ToInstance, uuid("{191FF367-C809-4a6f-8F87-820A53FEDDC4}") :
ToInstance

]

class TraceEventInvoking : TraceEvent

{ uint32 Category = 0x00000010;

uint32 EventID = 0x0015;

[id(0) : ToSubclass, MaxLen(256) : ToSubclass, PopulateMode("Manual") : ToSubclass, ParamIndex(0)]

string Service;

[id(1) : ToSubclass, MaxLen(256) : ToSubclass, PopulateMode("Manual") : ToSubclass, ParamIndex(1)]

string SoftwareElement;

[id(2) : ToSubclass, MaxLen(256) : ToSubclass, PopulateMode("Manual") : ToSubclass, ParamIndex(2)]

string ExecutionElement;

[ParamIndex(3)]

string Input;

//
// NOTE : Use Input from AdminEvent
//
};

[
    description("An event emitted when an execution element has begun executing."), EventGroup("Standard AdminEvents") : ToInstance, uuid("{7CBA2A54-5C8D-4099-BFD1-B9772BDA9A9B}") : ToInstance
]
class TraceEventInvokeBegin : TraceEvent
{
    uint32 EventID = 0x0016;
    uint32 Category = 0x00000040;

[id(0) : ToSubclass, MaxLen(256) : ToSubclass, PopulateMode("Manual") : ToSubclass, ParamIndex(0)]

string ExecutionElement;

[id(1) : ToSubclass, MaxLen(256) : ToSubclass, PopulateMode("Manual") : ToSubclass, ParamIndex(2), ParamDefault("")]

string SoftwareElement;

[ParamIndex(1)]

string Input;

//
// NOTE : Use Input from AdminEvent
//
};

[
    description("An event emitted when an execution element has finished executing."),
    EventGroup("Standard AdminEvents") : ToInstance,
    uuid("{9C8C3D60-B0F5-4152-BB15-239E9C67FBAC}") : ToInstance
]
class TraceEventInvokeEnd : TraceEvent
{
    uint32 EventID = 0x0027;
    uint32 Category = 0x00000080;

[id(0) : ToSubclass, MaxLen(256) : ToSubclass, PopulateMode("Manual") : ToSubclass, ParamIndex(0)]

string ExecutionElement;

[id(1) : ToSubclass, MaxLen(256) : ToSubclass, PopulateMode("Manual") : ToSubclass, ParamIndex(3), ParamDefault("")]

string SoftwareElement;

[id(2) : ToSubclass, PopulateMode("Manual") : ToSubclass, PropertyFilter(0x2) : ToSubclass, ParamIndex(1)]

string Output;

[id(3) : ToSubclass, PopulateMode("Manual") : ToSubclass, ParamIndex(2)]

sint32 ReturnCode;

};

[
description("An event emitted when an internal function has begun executing."), EventGroup("Standard AdminEvents") : ToInstance, uuid("{6A5F0DC3-3B4B-4d80-98D1-9E2589AFD1CF}") : ToInstance ]
class TraceEventInternalInvokeBegin : TraceEvent
{ uint32 EventID = 0x0026;

uint32 Category = 0x40000000;

[ParamIndex(0), PopulateMode("Manual")]

```
        string SourceImplementedBy;
        [ParamIndex(1), PopulateMode("Manual")]
        string SourceFunctionName;
        [ParamIndex(2), PopulateMode("Manual")]
        string Input;
};
```

```
[
        description("An event emitted when an execution element is being invoked."),
        EventGroup("Standard AdminEvents") : ToInstance,
        uuid("{37731F1A-6CE1-4bd9-B66D-F19BC8CC84AC}") : ToInstance
]
class TraceEventInvoked : TraceEvent
{
        uint32 EventID = 0x0018;
        uint32 Category = 0x00000020;

[id(0) : ToSubclass, MaxLen(256) : ToSubclass,
        PopulateMode("Manual") : ToSubclass, ParamIndex(0)]
        string Service;
        [id(1) : ToSubclass, MaxLen(256) : ToSubclass,
        PopulateMode("Manual") : ToSubclass, ParamIndex(1)]
        string SoftwareElement;
        [id(2) : ToSubclass, MaxLen(256) : ToSubclass,
        PopulateMode("Manual") : ToSubclass, ParamIndex(2)]
```

```
        string ExecutionElement;

[id(3) : ToSubclass, PropertyFilter(0x2) : ToSubclass,
PopulateMode("Manual") : ToSubclass, ParamIndex(4),
ParamDefault("")]

string Output;

[id(4) : ToSubclass, PopulateMode("Manual") : ToSubclass,
ParamIndex(3)]

sint32 ReturnCode;

};

[
        description("An event emitted when an internal function has
completed executing."), EventGroup("Standard AdminEvents") : ToInstance, uuid("{29A6747C-1931-4165-B588-FFCE29DF0E91}") :
ToInstance
]
class TraceEventInternalInvokeEnd : TraceEvent
{
        uint32 EventID = 0x00000027;

uint32 Category = 0x40000000;

[ParamIndex(0), PopulateMode("Manual")]

string SourceImplementedBy;

[ParamIndex(1), PopulateMode("Manual")]

string SourceFunctionName;
```

[id(0) : ToSubclass, PropertyFilter(0x2) : ToSubclass, PopulateMode("Manual") : ToSubclass, ParamIndex(2)]

string Output;

[id(1) : ToSubclass, PopulateMode("Manual") : ToSubclass, ParamIndex(3)]

sint32 ReturnCode;

//
    // NOTE : Use Input from AdminEvent
    //
};

[
    description("An event emitted when an execution element has returned data async to client."), EventGroup("Standard AdminEvents") : ToInstance, uuid("{9EBF71F9-75B3-4f74-85CA-CF1864D36E64}") : ToInstance
]
class TraceEventInvokeReply : TraceEvent
{
    uint32 EventID = 0x0019;

uint32 Category = 0x00000100;

[id(0) : ToSubclass, MaxLen(256) : ToSubclass, PopulateMode("Manual") : ToSubclass, ParamIndex(0)]

string Service;

[id(1) : ToSubclass, MaxLen(256) : ToSubclass, PopulateMode("Manual") : ToSubclass, ParamIndex(1)]

string SoftwareElement;

[id(2) : ToSubclass, MaxLen(256) : ToSubclass, PopulateMode("Manual") : ToSubclass, ParamIndex(2)]

string ExecutionElement;

[id(3) : ToSubclass, PopulateMode("Manual") : ToSubclass, ParamIndex(4), ParamDefault("")]

string Data;

[id(4) : ToSubclass, PopulateMode("Manual") : ToSubclass, ParamIndex(3), ParamDefault(0)]

sint32 ReturnCode;

};

[
    description("An event emitted when a resource has been allocated."),

EventGroup("Standard AdminEvents") : ToInstance, uuid("{C7FD7276-A3C4-436c-8960-79A06DD08E20}") : ToInstance

]

class TraceEventResourceAlloc : TraceEvent

{ uint32 EventID = 0x001E;

uint32 Category = 0x00000004;

[id(0) : ToSubclass, MaxLen(256) : ToSubclass, PopulateMode("Manual") : ToSubclass, ParamIndex(0)]

```
        string Name;

[id(1) : ToSubclass, PopulateMode("Manual") : ToSubclass,
ParamIndex(1)]

sint32 ResourceID;

[id(2) : ToSubclass, MaxLen(64) : ToSubclass,
PopulateMode("Manual") : ToSubclass, ParamIndex(2)]

string Type;

[id(3) : ToSubclass, PopulateMode("Manual") : ToSubclass,
ParamIndex(3)]

sint32 Amount = 0;
};

[
        description("An event emitted when a resource has been freed."),
        EventGroup("Standard AdminEvents") : ToInstance,
        uuid("{6E990927-7DEE-4318-9EE4-02BBE71565C4}") :
ToInstance
]
class TraceEventResourceDealloc : TraceEvent
{
        uint32 EventID = 0x001F;
        uint32 Category = 0x00000004;

[id(0) : ToSubclass, MaxLen(256) : ToSubclass,
PopulateMode("Manual") : ToSubclass, ParamIndex(0)]

string Name;

[id(1) : ToSubclass, PopulateMode("Manual") : ToSubclass,
ParamIndex(1)]
```

```
        sint32 ResourceID;

[id(2) : ToSubclass, MaxLen(64) : ToSubclass,
PopulateMode("Manual") : ToSubclass, ParamIndex(2)]
        string Type;
};

[
        description("An event emitted when a software element instance
is being created by the client."),
        EventGroup("Standard AdminEvents") : ToInstance,
        uuid("{A46224F3-103D-4837-AB6B-DBE0056F6887}") :
ToInstance
]
class TraceEventCreating : TraceEvent
{
        uint32 EventID = 0x001A;
        uint32 Category = 0x00000200;

[id(0) : ToSubclass, MaxLen(256) : ToSubclass,
PopulateMode("Manual") : ToSubclass, ParamIndex(0)]
        string Service;
        [id(1) : ToSubclass, MaxLen(256) : ToSubclass,
PopulateMode("Manual") : ToSubclass, ParamIndex(1)]
        string SoftwareElement;
};

[
``` description("An event emitted when a software element instance has been created."), EventGroup("Standard AdminEvents") : ToInstance, uuid("{637E71A8-5E35-4452-B6DA-9D4C011758FD}") : ToInstance

]

class TraceEventCreateBegin : TraceEvent

{ uint32 EventID = 0x001B;

uint32 Category = 0x00000800;

[id(0) : ToSubclass, MaxLen(256) : ToSubclass, PopulateMode("Manual") : ToSubclass, ParamIndex(0), ParamDefault("")]

string SoftwareElement;

};

[ description("An event emitted when an internal class instance creation has started."), EventGroup("Standard AdminEvents") : ToInstance, uuid("{3DB3E23C-FCAE-40fe-BEDA-D1024145C3CF}") : ToInstance

]

class TraceEventInternalCreateBegin : TraceEvent

{

[ParamIndex(0), PopulateMode("Manual")]

string SourceImplementedBy;

```
        uint32 EventID = 0x0028;
        uint32 Category = 0x40000000;
};

[
        description("An event emitted when an internal class instance creation has completed."),
        EventGroup("Standard AdminEvents") : ToInstance,
        uuid("{4130DE20-06F2-4206-9174-27E44F75154D}") : ToInstance
]
class TraceEventInternalCreateEnd : TraceEvent
{
        uint32 EventID = 0x00000029;
        uint32 Category = 0x40000000;

[ParamIndex(0), PopulateMode("Manual")]
        string SourceImplementedBy;
};

[
        description("An event emitted when a software element instance has been created."),
        EventGroup("Standard AdminEvents") : ToInstance,
        uuid("{8F205846-479C-4aab-9FEB-4B6D710594E1}") : ToInstance
]
```

```
class TraceEventCreateEnd : TraceEvent
{
        uint32 EventID = 0x00001000;
        uint32 Category = 0x00001000;

[id(0) : ToSubclass, MaxLen(256) : ToSubclass,
PopulateMode("Manual") : ToSubclass, ParamIndex(0),
ParamDefault("")]
        string SoftwareElement;
};

[
        description("An event emitted when a software element instance
was created and ref return to the client."),
        EventGroup("Standard AdminEvents") : ToInstance,
        uuid("{BB817E3F-1BED-4655-AF18-5E6AB94217F7}") :
ToInstance
]
class TraceEventCreated : TraceEvent
{
        uint32 EventID = 0x001D;
        uint32 Category = 0x00000400;

[id(0) : ToSubclass, MaxLen(256) : ToSubclass,
PopulateMode("Manual") : ToSubclass, ParamIndex(0)]
        string Service;
        [id(1) : ToSubclass, MaxLen(256) : ToSubclass,
PopulateMode("Manual") : ToSubclass, ParamIndex(1)]
```

```
        string SoftwareElement;

[id(2) : ToSubclass, PopulateMode("Manual") : ToSubclass,
ParamIndex(2)]

sint32 ReturnCode;

};

[
        description("An event emitted when a software element instance
has been destroyed."), EventGroup("Standard AdminEvents") : ToInstance, uuid("{38077B4A-0A2B-416a-99D2-24828B5BBF42}") :
ToInstance
]
class TraceEventDestroy : TraceEvent
{
        uint32 EventID  = 0x0021;

uint32 Category = 0x00000002;

[id(0) : ToSubclass, MaxLen(256) : ToSubclass,
PopulateMode("Manual") : ToSubclass, ParamIndex(0),
ParamDefault("")]

string SoftwareElement;

};

[
        description("An event emitted when an internal class instance has
been destroyed."), EventGroup("Standard AdminEvents") : ToInstance,
``` uuid("{85907B6F-B5CC-4005-8A5A-701FC949ABBB}") : ToInstance

]

class TraceEventInternalDestroy : TraceEvent

{ uint32 EventID = 0x002A;

uint32 Category = 0x40000000;

[ParamIndex(0), PopulateMode("Manual")]
    string SourceImplementedBy;

};

[ description("An event emitted when a software element is released by client."),

EventGroup("Standard AdminEvents") : ToInstance, uuid("{BBA1E042-8367-446e-B720-00C8059CE5BA}") : ToInstance

]

class TraceEventRelease : TraceEvent

{ uint32 EventID = 0x0020;

uint32 Category = 0x00010000;

[id(0) : ToSubclass, MaxLen(256) : ToSubclass, PopulateMode("Manual") : ToSubclass, ParamIndex(0)]
    string Service;

```
        [id(1) : ToSubclass, MaxLen(256) : ToSubclass,
PopulateMode("Manual") : ToSubclass, ParamIndex(1)]
        string SoftwareElement;
};

[
        description("An event emitted when a biz task has started."),
        EventGroup("Standard AdminEvents") : ToInstance,
        uuid("{A4E8862D-D051-4a9e-94D0-B1256DA313A5}") :
ToInstance
]
class TraceEventBizTaskBegin : TraceEvent
{
        uint32 EventID = 0x0022;
        uint32 Category = 0x00000040;

[ParamIndex(0), ParamDefault(""), PopulateMode("Either")]
        string BizTaskUserSession;
        [ParamIndex(1), ParamDefault("")]
        string Input;
};

[
        description("An event emitted when a biz task has completed."),
        EventGroup("Standard AdminEvents") : ToInstance,
        uuid("{5A50E6F7-943A-470e-B725-91FC5AA4F868}") :
ToInstance
]
```

```
class TraceEventBizTaskEnd : TraceEvent
{
    uint32 EventID = 0x0023;
    uint32 Category = 0x00000080;

[id(0) : ToSubclass, PopulateMode("Manual") : ToSubclass,
PropertyFilter(0x2) : ToSubclass, ParamIndex(2), ParamDefault("")]
    string Output;
    [id(1) : ToSubclass, PopulateMode("Manual") : ToSubclass,
ParamIndex(0)]
    sint32 ReturnCode;
    [id(2) : ToSubclass, PopulateMode("Manual") : ToSubclass,
ParamIndex(3), ParamDefault(0)]
    uint32 ResponseTime;

[ParamIndex(1), PopulateMode("Either"), ParamDefault("")]
    string BizTaskUserSession;
};

[
    description("An event emitted when an element has been
dispensed from a pool."),
    EventGroup("Standard AdminEvents") : ToInstance,
    uuid("{B06F119D-7D42-4468-83E7-1A1E3075C4B1}") :
ToInstance
]
class TraceEventDispensedFromPool : TraceEvent
{
```

```
uint32 EventID = 0x0024;

uint32 Category = 0x00000008;

[id(0) : ToSubclass, PopulateMode("Manual") : ToSubclass,
ParamIndex(0)]

sint32 ElementID;

[id(1) : ToSubclass, MaxLen(64) : ToSubclass,
PopulateMode("Manual") : ToSubclass, ParamIndex(1)]

string Type;

[id(2) : ToSubclass, PopulateMode("Manual") : ToSubclass,
ParamIndex(2)]

sint32 Count;

[id(3) : ToSubclass, PopulateMode("Manual") : ToSubclass,
ParamIndex(3)]

sint32 CurrentPoolCount;

};

[
    description("An event emitted when an element has been returned
to a pool."), EventGroup("Standard AdminEvents") : ToInstance, uuid("{A0B2BAB0-326D-42e5-A3EF-93D2D4D95EA3}") :
ToInstance ]
class TraceEventReturnedToPool : TraceEvent
{
    uint32 EventID = 0x0025;

uint32 Category = 0x00000008;
```

[id(0) : ToSubclass, PopulateMode("Manual") : ToSubclass, ParamIndex(0)]

sint32 ElementID;

[id(1) : ToSubclass, MaxLen(64) : ToSubclass, PopulateMode("Manual") : ToSubclass, ParamIndex(1)]

string Type;

[id(2) : ToSubclass, PopulateMode("Manual") : ToSubclass, ParamIndex(2)]

sint32 Count;

[id(3) : ToSubclass, PopulateMode("Manual") : ToSubclass, ParamIndex(3)]

sint32 CurrentPoolCount;

};

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method for developing software, the software being produced by a programmer and being run by an operator separate from the programmer, the programmer also maintaining the software by responding to events that occur in connection with the running software, the method comprising:

determining, via consensus of the programmer and the operator, a form of events to be included in a specification;

the operator defining the specification including a plurality of the events that may occur during running of the software, and for each event a plurality of properties descriptive of the event;

the programmer producing the software based on the defined specification by including for each event in the defined specification instructions in the software to generate a signal when the event occurs;

at least one of the operator and the programmer producing a library including methods that can be invoked by the running software, each method corresponding to one of the plurality of events, and data structures that can be populated by the running software, each data structure corresponding to one of the plurality of events and being populated with the plurality of properties corresponding to the event when the event occurs; and the operator running the produced software, including the act of said operator receiving information which indicates the occurrence of said one of the events, wherein said running act includes said operator receiving said properties descriptive of the occurring one of the events in accordance with the populated data structure corresponding to the event, the populated data structure having been populated by the software upon the occurrence of the one of the events by calling the corresponding method in the library.

2. The method of claim 1, wherein each method in the library has instructions to signal the occurrence of the corresponding one of the events.

3. The method of claim 2, further comprising enabling a trace mode, wherein at least one of said methods determines that said trace mode has been enabled prior to signaling an event.

4. The method of claim 2, wherein said methods signal the events by communicating the information to an event service, and wherein said event service invokes an event handler in response to the receipt of the information.

5. The method of claim 1, further comprising:

said operator specifying a category of event information to be received, and wherein said act of said operator receiving information includes receiving only the information within said category.

* * * * *